United States Patent [19]

Strolle et al.

[11] 4,281,078

[45] Jul. 28, 1981

[54] HIGH-SOLIDS POLYURETHANE ENAMEL COATING COMPOSITION

[75] Inventors: Clifford H. Strolle, Springfield, Pa.; Glenn D. Thornley, Wilmington, Del.

[73] Assignee: E. I. Du Pont de Nemours and Company, Wilmington, Del.

[21] Appl. No.: 97,582

[22] Filed: Nov. 26, 1979

[51] Int. Cl.³ .............................................. C08L 75/06
[52] U.S. Cl. .............................. 525/131; 260/31.4 R; 260/32.8 N; 525/127; 525/920
[58] Field of Search ......................... 525/127, 131, 920

[56] References Cited

U.S. PATENT DOCUMENTS

| | | | |
|---|---|---|---|
| 3,098,835 | 7/1963 | Gaylord | 260/336 |
| 3,382,294 | 5/1968 | Christenson | 260/850 |
| 3,531,364 | 9/1970 | Schmidle | 525/127 |
| 3,532,652 | 10/1970 | Zang | 525/127 |
| 3,558,564 | 1/1971 | Vasta | 260/77.5 |
| 3,642,943 | 2/1972 | Noel | 525/127 |
| 3,843,593 | 10/1974 | Shell | 260/40 R |
| 3,919,351 | 11/1975 | Chang | 525/131 |
| 3,975,457 | 8/1976 | Chang | 525/131 |
| 4,020,216 | 4/1977 | Miller | 428/425 |
| 4,076,766 | 2/1978 | Simms | 260/850 |
| 4,143,091 | 3/1979 | Chang | 525/127 |
| 4,208,494 | 6/1980 | Chang | 525/920 |
| 4,208,495 | 6/1980 | Chang | 525/920 |

Primary Examiner—Paul Lieberman

[57] ABSTRACT

A coating composition of a urethane polymer has film-forming constituents of an organic polyisocyanate, a low molecular weight hydroxyl-functional acrylic copolymer, and a low molecular weight hydroxyl-functional polyester based on branched-chain glycols. The composition can be applied at environmentally-acceptable solids levels and cured at ambient temperatures to form a durable film.

14 Claims, No Drawings

HIGH-SOLIDS POLYURETHANE ENAMEL COATING COMPOSITION

BACKGROUND OF THE INVENTION

1. Field of the Invention

This invention relates to a high-solids polyurethane film-forming composition of a polyisocyanate and low molecular weight polyester and addition polymers that have controlled hydroxylfunctionality.

2. Description of the Prior Art

Polyurethane compositions have generally been used as coatings, adhesives, or molding materials. The inclusion in these compositions of a hydroxyl-containing polymer and a polyisocyanate is shown, for example, in U.S. Pat. No. 3,245,941 issued Apr. 12, 1961 to Mayer, et al. Such compositions are useful as coatings, but do not provide the durability, flexibility, and chemical resistance required for industrial finishes.

Polyurethane coatings which consist of hydroxyl-containing acrylic polymers and hydroxylfunctional polyesters that are crosslinked with a polyisocyanate are shown, for example, in U.S. Pat. No. 4,020,216 issued Apr. 26, 1977 to Miller and in U.S. Pat. No. 3,919,351 issued Nov. 11, 1975 to Chang, et al. These coatings exhibit the above-mentioned properties necessary in industrial finishes, but cannot be usefully applied at highsolids levels.

With the current emphasis on reduction of solvent emissions and lowering of energy consumption, there is a continued need for a polyurethane coating which not only can be spray-applied at high weight-solids levels but also can be cured at ambient temperature to produce a durable, flexible, chemical-resistant finish.

SUMMARY OF THE INVENTION

There is provided by the present invention, a coating composition, capable of curing at ambient temperatures, of a mixture of a polymer blend and a solvent for the polymer blend wherein the blend is 65-90% by weight of the mixture and consists essentially of (a) 25-45% by weight, based on the weight of the blend, of an organic polyisocyanate;

(b) 5-25% by weight, based on the weight of the blend, of a copolymer of
  (1) a hydroxyalkyl ester of acrylic or methacrylic acid wherein the alkyl group has 2-10 carbon atoms, and
  (2) at least one other ethylenically unsaturated monomer that is copolymerizable with the hydroxyalkyl ester but that is free of functional groups reactive with the polyisocyanate at ambient temperatures,
wherein the copolymer has a hydroxyl content of 2-6% by weight; and (c) 40-60% by weight, based on the weight of the blend, of a polyester polyol that is the reaction product of
  (1) pentaerythritol and at least one branched-chain glycol wherein the molar ratio of glycol to pentaerythritol is from 2:1 to 6:1,
  (2) an aromatic or aliphatic monocarboxylic acid, or mixtures thereof, having no more than 18 carbon atoms, and
  (3) a mixture of an aromatic and an aliphatic dicarboxylic acid wherein the molar ratio of aromatic acid to aliphatic acid is from 2:1 to 6:1,
wherein the polyol has a hydroxyl content of 5-9% by weight.

DETAILED DESCRIPTION OF THE INVENTION

The high-solids enamel coating composition of the present invention is composed primarily of a film-forming polymer blend and a solvent for the blend, although it can optionally also contain pigments, a reaction catalyst to decrease the curing time, and any of the various additives that are advantageously used in coating compositions for industrial finishes. The polymer blend consists essentially of a polyisocyanate, a hydroxyl-functional acrylic copolymer, and a polyester polyol. The polymer blend constitutes 65-90%, preferably 70-80%, of the combined weight of the blend and the solvent.

The organic polyisocyanates that can be used in the present invention make up 25-45%, preferably 30-40%, by weight of the film-forming blend. These include aliphatic, cycloaliphatic, alkaryl, aralkyl, heterocyclic, and aryl di- or triisocyanates. Oligomers of these can also be used.

Typically useful polyisocyanates are, for example,
diphenylmethane-4,4'-diisocyanate, diphenylene-4,4'-diisocyanate
toluene-2,4-diisocyanate,
toluene-2,6-diisocyanate,
3,3'-dimethoxy-4,4'-diphenylene diisocyanate methylene-bis-(4-cyclohexyl isocyanate)
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate,
p-phenylene diisocyanate, 1,5-naphthalene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
furfurylidene diisocyanate,
bis-(2-isocyanatoethyl)fumarate,
1,3,5-benzene triisocyanate,
para, para', para''-triphenylmethane triisocyanate,
3,3'-diisocyanatodipropyl ether,
xylylene diisocyanate,
$\beta,\beta$-diphenyl propane-4,4'-diisocyanate, and
isophorone diisocyanate Preferred among these are hexamethylene diisocyanate, methylene-bis-(4-cyclohexyl isocyanate), and isophorone diisocyanate. Particularly preferred polyisocyanates are biurets of the formula

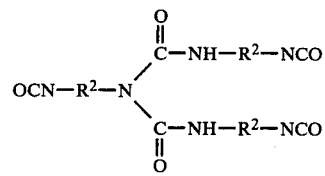

where $R^2$ is an aliphatic or aromatic hydrocarbon group having 1-12 carbon atoms. These biurets can be made according to Wagner et al. U.S. Pat. No. 4,015,165, issued Sept. 27, 1977. In a most preferred biuret, $R^2$ is —$(CH_2)_6$—. This biuret is a trimer of hexamethylene diisocyanate (HMDI), which is obtained by reacting three moles of HMDI with one mole of water.

The hydroxyl-functional acrylic copolymer used in the present invention is prepared by copolymerizing at least one hydroxylalkyl ester of acrylic or methacrylic acid with at least one other ethylenically-unsaturated monomer. The copolymer constitutes 5–25% by weight, preferably 10–20% by weight, of the film-forming polymer blend.

The hydroxyalkyl ester preferably has 2–10 carbon atoms in the alkyl group. Typical are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, and hydroxyoctyl acrylate. Most preferred are hydroxyalkyl acrylates and methacrylates in which the hydroxyl group is primary and the alkyl group has 2–4 carbon atoms.

The other ethylenically unsaturated monomers that can be copolymerized with the above hydroxyalkyl esters are any of those conventionally used in film-forming polymers with the proviso that these monomers contain no functional groups that react with the polyisocyanates at ambient temperatures. Examples of such monomers are vinyl chloride, vinylidene chloride, olefins, such as ethylene, propylene and the like; vinyl acetate, conjugated dienes having 4 to 10 carbon atoms, such as butadiene; aromatic hydrocarbons having vinylene groups, such as styrene, alkyl substituted styrene, such as α-methyl styrene; alkyl maleate, such as dibutyl maleate; esters of methacrylic acid and acrylic acid, preferably alkyl esters having 1–12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers.

The co-polymerization of the monomeric constitutents is preferably accomplished in an inert organic solvent in the presence of a free-radical forming initiator of the peroxide or azo type. Typical solvents are aromatics, esters, ethers, ketones, and the like. Examples are benzene, toluene, xylene, butyl acetate, ethylene glycol monoethyl ether acetate, acetone, methylisobutyl ketone, and methylethyl ketone. Useful initiators are, for example, benzoyl peroxide, lauroyl peroxide, ditertiary butyl peroxide, cumene hydroperoxide, and azoisobutyric acid dinitrile. Conventional polymerization temperatures, based on reflux, are used, preferably in the range of 50° C. to about 200° C. The reaction is carried out to the point that the copolymer has a number average molecular weight (as determined by gel permeation chromatography having polystyrene standards) of 1000 to 5500 preferably 4000 to 5000. The hydroxyl content of the resultant polymer should be about 2–6% by weight, with a range of 4–5.5% being most preferred.

It has been found that an especially useful copolymer for the present invention consists essentially of monomer units of styrene, 20–30% by weight; ethyl methacrylate, 20–30% by weight; lauryl methacrylate, 10–30% by weight; and hydroxyethyl acrylate, 25–35% by weight. Another preferred copolymer consists essentially of monomer units of methyl methacrylate, 40–60% by weight; lauryl methacrylate, 10–30% by weight; and hydroxyethyl acrylate, 25–35% by weight.

The polyester polyol used in the present invention constitutes 40–60% by weight, preferably 45–55% by weight, of the film-forming polymer blend. This polyol is the condensation-reaction product of pentaerythritol and a glycol, a monocarboxylic acid, and an aromatic and an aliphatic dicarboxylic acid.

The first set of reactants necessary to form the polyester polyol useful in the invention is pentaerythritol and at least one glycol of the branched-chain variety. It has been found that the incorporation of such a glycol and pentaerythritol into the polyester imparts the desired hardness to the final cured film. Any branched-chain glycols are usable in the formation of this polyester, although it is preferred that these glycols contain no more than 8 carbon atoms. Neopentyl glycol and pinacol are examples of preferred branched-chain glycols. A particularly useful polyol is formed when the molar ratio of glycol to pentaerythritol is from 2:1 to about 6:1. A ratio of 3:1 to 4.5:1 is preferred.

The monocarboxylic acid component of the polyester polyol is present primarily to prevent molecular weight build-up of the polyol. To this end, it has been found that any aromatic or aliphatic monocarboxylic acid, or mixtures of these, having 18 or less carbon atoms can be used. Normally, this acid will be used in a molar ratio of acid to pentaerythritol of about 1:1 to 2.5:1.

Examples of preferred aromatic monocarboxylic acids are benzoic acid, paratertiary butylbenzoic acid, triethyl benzoic acid, toluic acid, phenylacetic acid, and the like. Examples of preferred aliphatic acids are acetic acid, propionic acid, butyric acid, valeric acid, caproic acid, caprylic acid, pelargonic acid, capric acid, lauric acid, myristic acid, palmitic acid, stearic acid, or the unsaturated analogs of these. Branched-chain aliphatic monocarboxylic acids can also be used. Most preferred are benzoic acid, lauric acid, and pelargonic acid.

The dicarboxylic acids useful in the formation of the polyester polyol have the general formula

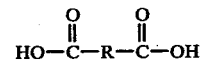

where R is aliphatic or aromatic. Within the aliphatic genus, the most useful species are alkylene or vinylene.

Preferred acids when R is alkylene are those in which R has 2–10 carbon atoms. Most preferred of these are succinic acid, glutaric acid, adipic acid and pimelic acid. When R is vinylene, the most useful acids are those in which R has 2–8 carbon atoms with the preferred ones being maleic acid and itaconic acid. The aromatic dibasic acids that are preferred are phthalic, iso-phthalic, terephthalic, uritic, and cumidinic acids, although other aromatic dibasic acids could also be used.

Mixtures of these aromatic and aliphatic dicarboxylic acids can also be used. Nevertheless, whether mixtures of each kind of acid are used or whether only one of each kind of acid is used, the molar ratio of aromatic diacids to aliphatic diacid should have a range of about 2:1 to 6:1. a ratio of about 3:1 is preferred. It is to be further understood that the lower alkyl mono- or diesters of these acids and the anhydrides, where applicable, of these acids can also be used in place of the acids themselves with equivalent results. If the above-mentioned esters are used, the alkyl groups preferably have no more than 5 carbon atoms.

The polyester polyol can typically be formed by charging the reactants and a suitable solvent into a reaction vessel. The reaction mixture is then heated to its reflux temperature, usually about 100°–300° C., and there maintained for a period of 1–8 hours. During this period the water of esterification is withdrawn. The reaction product, the polyester polyol, should have a number average molecular weight (determined by gel permeation chromatography based on polystyrene standards) of 150–1000, preferably 250–450. The reactant should be chosen also so that the polyester polyol has a hydroxyl content of 5–9% by weight, preferably 7–8% by weight.

The hydroxyl-containing copolymer and the polyester polyol, formed as described above, are each in solution and are suitable for direct use to form the coating composition of this invention by blending with each other and with a solution of the polyisocyanate. In practice, a two component system can be used. That is, a solution of polyisocyanate is in one package, and a solution of the hydroxyl-containing copolymer and polyol is in a separate package. The two solutions are thoroughly mixed just before applying the coating composition. Separation of the two solutions is usually necessary since the "pot life" of the composition is short—the polyisocyanate reacts with the hydroxyl groups of the copolymer and polyol at a rapid rate, even at room temperature.

Regardless of the method by which the final coating composition is mixed, the composition contains 65–90% by weight of the polymer blend and 10–35% by weight of a solvent for the blend, these percentages being based on the combined weights of the solvent and the blend. One of the useful aspects of the present invention is that it can be conveniently spray-applied even at these high weight-solids levels. The solvent of the final composition can be a mixture of the organic solvents in which the constituents of the polymer blend are each formed.

The coating composition of this invention may contain about 0.01–2.0% by weight, based on the weight of the polymer blend, of a curing catalyst. The catalysts are usually organo metallics such as dibutyl tin dilaurate and zinc octoate, which are preferred, dibutyl tin di-2-ethylhexoate, stannous octoate, stannous oleate, zinc naphthenate, vanadium acetyl acetonate, and zirconium acetyl acetonate. Also useful as catalysts are tertiary amines, such as, for example, triethylene diamine, heptamethylisobiguanide, triethylamine, pyridine, dimethylaniline, and methyl morpholine. When a two-component system is used, the catalyst can be added to either the polyisocyanate solution or the solution of the hydroxyl-containing copolymer and the polyester polyol.

Instead of the two-component, "two-package", system described above, a "one package" coating composition can be prepared if the reactive groups of the polyisocyanate are blocked with a blocking agent such a methyl ethyl ketoxime. This eliminates the need for keeping the hydroxyl-containing copolymer and polyester polyol apart from the polyisocyanate until just before use. When the coating composition, with the blocked polyisocyanate, is applied and heated to 150°–160° C., the blocking agent is released, permitting the polyisocyanate to react with the copolymer and the polyester.

To provide the novel coating composition with other characteristics that may be desirable under some conditions, other compatible polymers may be blended with the coating composition, such as polymethyl methacrylate, polystyrene and the like. For example, 20–40% by weight, based on the weight of the polymer blend, of polymethyl methacrylate decreases the drying time and enhances the gloss and appearance of the dried coating.

The coating composition of the invention can be pigmented, containing an amount of pigment in a pigment/polymer-blend weight ratio of about 0.2/1 to 100/1. Useful pigments are, for example, metallic oxides, such as titanium dioxide or zinc oxide; metal hydroxides; metal flakes; sulfides; sulfates; carbonates; carbon black; silica; talc; china clay; and organic dyes.

The pigments can be introduced into the coating composition by first forming a mill base with either the hydroxyl-containing copolymer, the polyester polyol, or both. The mill base can be formed, for example, by conventional sand-grinding or ball-milling techniques, and then can be blended, by simple stirring or agitation, with the other constituents of the coating composition.

The coating composition can further optionally contain an ultraviolet light stabilizer, an antioxidant, or both. The ultraviolet light stabilizer can be present in an amount of 1–20% by weight, based on the weight of the polymer blend; the antioxidant can be present in an amount of 0.1–5% by weight, based on the weight of the polymer blend.

Typical ultraviolet light stabilizers are benzophenones, triazoles, triazines, benzoates, lower alkyl thiomethylene-containing phenols, substituted benzenes, organophohphorous sulfides, and substituted methylene malonitriles. Particularly useful are the hindered amines and nickel compounds shown in U.S. Pat. No. 4,061,616 (Dec. 6, 1977).

Typical antioxidants are tetra-kis alkylene (di-alkyl hydroxy aryl) alkyl ester alkanes, reaction product of p-amino diphenylamine and glycidyl methacrylate, and alkyl hydroxyphenyl groups bonded through carboalkoxy linkages to a nitrogen atom of of a heterocyclic nucleus containing an imidodicarbonyl group or an imidodithiocarbonyl group.

One preferred combination of ultraviolet light stabilizer and antioxidant is 2-hydroxy-4-dodecyloxy benzophenone or a substituted 2(2'-hydroxyphenyl)benzotriazole and tetra-kis methylene 3(3',5'-dibutyl-4'hydroxyphenyl)propionate methane.

The coating composition of this invention can be applied to a variety of substrates by any of the conventional application methods such as spraying, dipping, brushing, or flow coating. Substrates that can be advantageously coated with the present composition are, for example, metal, steel, wood, glass, or plastics such as polypropylene, polystyrene, copolymers of styrene, and the like. The coating is particularly suited for application over primed or unprimed metal or steel. Typical uses are for coating steel that has been treated with zinc phosphate, metal substrates pre-coated with conventional alkyd or epoxy primers, and galvanized steel.

The coating can be cured at ambient temperatures or can be dried by heating at 50°–120° C. for 15 minutes to two hours. As noted, however, if the coating contains a blocked polyisocyanate, temperatures of 150°–160° C. are necessary. When cured at ambient conditions, the coating is tackfree after four hours, and has a knoop hardness of 1.4 and pencil hardness of H after 6 days. As further drying occurs, hardness progresses advantageously, and the composition finally dries to a coating that can be polished by conventional techniques to further improve the gloss or appearance.

It is further possible to apply the coating composition of the present invention as a two-coat system in which a first, pigmented coat is applied as previously described over the substrate and is then overlaid with a second, unpigmented coat. This can impart to the finish a gloss or appearance that is improved over that attainable when a single coat system is used. When such a two-coat system is employed, however, the first coat should be allowed to cure to a point where it is tack-free before the second coat is applied. This will normally prevent the solvent in the second coat from attacking the first coat. This attack, or strike-in, can cause the polymer blends of the two coats to combine at the coat's interface, negating the improvement in the gloss or appearance.

Irrespective of whether a one-coat or two-coat system is used, however, the cured coating is hard, durable, scratch and stain resistant, weather resistant, and chemical resistant. It is suitable, for example, for coating automobile or truck bodies, railroad equipment, appliances, and any industrial equipment.

The following example illustrates the best mode of the invention.

EXAMPLE

The following 3 ingredients are prepared as follows:

1. Copolymer Solution

|  | Parts By Weight |
|---|---|
| Portion 1 |  |
| Ethylene glycol monoethyl ether acetate | 259.08 |
| Portion 2 |  |
| Methyl methacrylate | 306.35 |
| Lauryl methacrylate | 122.54 |
| Hydroxyethyl acrylate | 183.81 |
| Ditertiary butyl peroxide | 20.22 |

Portion 1 is charged into a reaction vessel and heated to reflux, approximately 150° C. Reflux is maintained for 1 hour, after which time Portion 2 is added, with mixing, over a 7-hour period. The mixture is maintained at reflux during this time and for an additional 2-hours thereafter. the resulting copolymer has a hydroxyl content of 4.4% by weight (based on copolymer weight) and a number-average molecular weight (gel permeation chromatography) of 4700. The copolymer solution has a Gardner-Holdt viscosity of Z-4 and a solids content of 72% by weight.

2. Polyester Solution

|  | Parts By Weight |
|---|---|
| Portion 1 |  |
| Pentaerythritol | 94.16 |
| Benzoic acid | 168.94 |
| Neopentyl glycol | 288.00 |
| Isophthalic acid | 143.70 |
| Phthalic anhydride | 128.09 |
| Adipic acid | 63.17 |
| Xylene | 35.03 |
| Portion 2 |  |
| Ethyl acetate | 107.71 |

Portion 1 is charged into a reaction vessel equipped with an agitator and vapor condenser, and is heated quickly to 215° C. This temperature is maintained until the reaction is completed, determined by monitoring the flow of the water of esterification from the condenser. Total water collected is 84.8 parts by weight. The mixture in the reaction vessel is cooled to 80° C., and Portion 2 is added. This mixture is agitated for 1 hour and then filtered. The resulting reaction product, the polyester polyol, has a hydroxyl content of 7.7% by weight (based on product solids weight) and a number average molecular weight (gel permeation chromatography) of 340. The polyester solution has a Gardner Holdt viscosity of Z-2 and a solids content of 85% by weight.

3. Mill Base

|  | Parts By Weight |
|---|---|
| Portion 1 |  |
| Methyl ethyl ketone | 5.327 |
| Copolymer solution (ingredient 1) | 8.154 |
| Polyester solution (ingredient 2) | 30.330 |
| Hydroxyethyl cellulose | 0.087 |
| Portion 2 |  |
| TiO$_2$ white pigment | 56.102 |

Portion 1 is added to a vessel and mixed for 15 minutes. Portion 2 is then added and mixing is continued for 1 hour. This mixture is then changed into a sand mill and ground at a temperature of about 35° C.

A coating composition is then prepared with the following constituents:

|  | Parts By Weight |
|---|---|
| Portion 1 |  |
| Copolymer solution (ingredient 1) | 78.32 |
| Polyester solution (ingredient 2) | 121.38 |
| Mill base (ingredient 3) | 1117.67 |
| Portion 2 |  |
| Solution of dimethyl siloxane (anti-bubbling agent) | 9.64 |
| Dibutyl tin dilaurate (2% weight in ethyl acetate) | 20.99 |
| Portion 3 |  |
| Polyisocyanate (trimer of hexamethylene diisocyanate, 75% weight solids in ethylene glycol monoethyl ether acetate) | 379.00 |

Portion 1 is charged into a stainless steel vessel and mixed for 15 minutes after which time Portion 2 is added, with mixing continuing for an additional 5 minutes. Portion 3 is then thoroughly mixed into the vessel, giving a coating composition in which the polymer blend (copolymer, polyester, and polyisocyanate) is 72.33% of the combined weight of the polymer blend and solvent. Including pigments, the coating composition is 82.38% solids by weight.

The coating composition is sprayed (airless spray using a pressure of 2400 pounds per square inch) onto polished steel panels that had been primed with an epoxy-based primer, and the coated panels are allowed to dry at ambient temperatures for 6 days. When then tested, the coating has a thickness of 5-7 mils, a knoop hardness of 1.4 and a gloss, measured at 20°, of 90. (There is negligible gloss loss after 3-months, horizontal Florida exposure.) Several panels are placed in a salt-spray cabinet where they are exposed to a mist of a solution of NaCl (5% by weight) in water for 1000 hours at 38° C. No blisters or corrosion can be observed after the exposure.

A one-molar solution of each of hydrochloric acid, sulfuric acid, acetic acid, nitric acid, ammonium hydroxide, and sodium hydroxide is prepared. A panel, on which the coating had been allowed to dry at ambient temperature for 10 days, is placed in contact with each solution for 16 hours. No staining of the coating occurs in any case. The coatings of such panels are also found to be immune from attack by common solvents like toluene, xylene, and methyl ethyl ketone.

What is claimed is:

1. A coating composition, capable of curing at ambient temperatures, of a mixture of a polymer blend and a solvent for the polymer blend wherein the blend is 65–90% by weight of the mixture and consists essentially of
   (a) 25–45% by weight, based on the weight of the blend, of an organic polyisocyanate;
   (b) 5–25% by weight, based on the weight of the blend, of a copolymer of
      (1) a hydroxyalkyl ester of acrylic or methacrylic acid wherein the alkyl group has 2–10 carbon atoms and wherein the hydroxyalkyl ester is 25–35% by weight of the copolymer, and
      (2) at least one other ethylenically unsaturated monomer that is copolymerizable with the hydroxyalkyl ester but that is free of functional groups reactive with the polyisocyanate at ambient temperatures, wherein this monomer is selected from the group consisting of vinyl chloride, vinylidene chloride, ethylene, propylene, vinyl acetate, butadiene, styrene, α-methyl styrene, dibutyl maleate, $C_1$–$C_{12}$ alkyl esters of acrylic acid, $C_1$–$C_{12}$ alkyl esters of methacrylic acid, and mixtures of these
      wherein the copolymer has a hydroxyl content of 2–6% by weight; and
   (c) 40–60% by weight, based on the weight of the blend, of a saturated polyester polyol that is the reaction product of
      (1) pentaerythritol and at least one branched-chain glycol wherein the molar ratio of glycol to pentaerythritol is from 2:1 to 6:1,
      (2) an aromatic or aliphatic monocarboxylic acid selected from the group consisting of benzoic acid, paratertiary butyl-benzoic acid, triethyl benzoic acid, toluic acid, phenylacetic acid, acetic acid, propionic acid, butyric acid, valeric acid, caproic acid, caprylic acid, pelargonic acid, capric acid, lauric acid, myristic acid, palmitic acid, stearic acid, and mixtures of these, and
      (3) a mixture of an aromatic and a aliphatic dicarboxylic acid wherein the molar ratio of aromatic acid to aliphatic acid is from 2:1 to 6:1,
      wherein the polyol has a hydroxyl content of 5–9% by weight.

2. The coating composition of claim 1 in which the organic polyisocyanate is selected from the group consisting of aliphatic diisocyanates, cycloaliphatic diisocyanates, alkaryl diisocyanates, aralkyl diisocyanates, heterocyclic diisocyanates, and aryl diisocyanates.

3. The coating composition of claim 1 in which the organic polyisocyanate has the formula

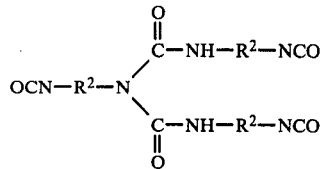

wherein $R^2$ is aromatic or an aliphatic hydrocarbon radical having 1–12 carbon atoms.

4. The coating composition of claim 3 wherein the copolymer is of hydroxyethyl acrylate, styrene, and at least one other alkyl methacrylate.

5. The coating composition of claim 3 wherein the copolymer is of hydroxyethyl acrylate, lauryl methacrylate, and at least one other alkyl methacrylate.

6. The coating composition of claim 4 or 5 wherein the branched-chain glycol is neopentyl glycol; the monocarboxylic acid is selected from the group consisting of benzoic acid, lauric acid, pelargonic acid, and mixtures of these; and the aromatic dicarboxylic acid is selected from the group consisting of phthalic acid, isophthalic acid, terephthalic acid, and mixtures of these, and the aliphatic dicarboxylic acid is selected from the group consisting of succinic acid, glutaric acid, adipic acid, pimelic acid, and mixtures of these.

7. The coating composition of claim 3 wherein the copolymer is of hydroxyethyl acrylate, methyl methacrylate, and lauryl methacrylate and wherein the polyester polyol is the reaction product of pentaerythritol, neopentyl glycol, benzoic acid, isophthalic acid, phthalic acid, and adipic acid.

8. The coating composition of claim 3 wherein the copolymer is of hydroxyethyl acrylate, lauryl methacrylate, ethyl methacrylate, and styrene, and wherein the polyester polyol is the reaction product of pentaerythritol, neopentyl glycol, lauric acid, isophthalic acid, phthalic acid, and adipic acid.

9. The coating composition of claims 3, 4, 5, 7, or 8 additionally containing pigment.

10. The coating composition of claims 3, 4, 5, 7, or 8 additionally containing an ultraviolet light stabilizer and an oxidant.

11. A substrate coated with a first cured coating composition according to claim 3 overlaid with a second cured coating composition according to claim 3 wherein the first composition contains pigment and wherein the second composition is unpigmented.

12. The substrate of claim 11 wherein the first cured coating composition additionally contains a ultraviolet light stabilizer.

13. The substrate of claim 12 wherein the first cured coating composition additionally contains an antioxidant.

14. The substrate of claim 13 wherein the second cured coating composition additionally contains and ultraviolet light stabilizer and antioxidant.

* * * * *